United States Patent [19]

Lange et al.

[11] Patent Number: 4,802,199
[45] Date of Patent: Jan. 31, 1989

[54] METHOD AND APPARATUS FOR PROVIDING VIRTUAL FACILITY COMMUNICATION SERVICE

[75] Inventors: Michael D. Lange, Red Bank; Nicholas K. Smith, Aberdeen; Carl Willems, Ocean, all of N.J.

[73] Assignees: American Telephone and Telegraph Company, New York, N.Y.; AT&T Information Systems Inc., Morristown, N.J.

[21] Appl. No.: 64,648

[22] Filed: Jun. 22, 1987

[51] Int. Cl.$^4$ .......................... H04M 1/27; H04M 3/42
[52] U.S. Cl. ...................................... 379/221; 379/216
[58] Field of Search ............... 379/216, 221, 207, 354, 379/355, 230, 234, 240

[56] References Cited

U.S. PATENT DOCUMENTS

| | | | |
|---|---|---|---|
| 4,313,036 | 1/1982 | Jabara et al. | 179/18 DA |
| 4,348,554 | 9/1982 | Asmuth | 179/18 DA |
| 4,447,676 | 5/1984 | Harris et al. | 379/221 X |
| 4,594,477 | 6/1986 | Noirot | 379/221 |
| 4,600,812 | 7/1986 | Gerlits | 379/221 X |

OTHER PUBLICATIONS

L. G. Anderson & P. F. Lambert, "Modifying No. 1 ESS for Enhanced Private Network Service", *Bell Laboratories Record*, Feb. 1979, pp. 46–52.

S. S. Katz, I. M. Lifchus and M. H. Skeer, "A Sophisticated Switched Service", *Bell Laboratories Record*, Feb. 1979, pp. 38–45.

*Primary Examiner*—James L. Dwyer
*Attorney, Agent, or Firm*—John A. Caccuro

[57] ABSTRACT

A communication system is arranged to provide a virtual private line facility connection to another communication system using the public switched network. In response to a predetermined signal preceding a called party dialing signal received from a user, the system accesses a virtual facility table to obtain an intersystem dialing signal necessary to establish a connection to an access line of the other communication system. The system sends the intersystem dialing signal followed by the called party dialing signal to the public switched network. The intersystem dialing signal establishes a connection to the other system which then uses the received called party dialing signal to establish a connection from that system to the called party. The virtual facility table is made accessible to speed dialing, repertory dialing, station message detail recording and automatic route selection features of the system.

12 Claims, 7 Drawing Sheets

| | | |
|---|---|---|
| 310 | SYSTEM 110 TO SYSTEM 130 | |
| 320 | DIALED NUMBER | 100 987 4321 *4567<br>FAC ACCESS BARRIER |
| 330 | VF ACCESS | 1-415-212-7890 |
| 340 | VFN | #190 OR REPERTORY DIAL BUTTON<br>341 342 343 344 345 346 348 347<br>FAC SYSTEM ACCESS BARRIER ARS INSERT DIALED NO.<br>100 987 4321 * 4567 * 9 TCN IXC #5<br>360—SYSTEM 110 TO SYSTEM 130   349 351 |
| 350 | VFN PLUS DIALED NUMBER | #190 1-415-212-7890 |

ROUTE PATTERN TABLE 600

| | | | |
|---|---|---|---|
| 601 — BEGIN TIME FOR RSP 1 | TIME IN MINUTES | | |
| 602 — END TIME FOR RSP 1 | TIME IN MINUTES | | |
| 603 { RSP 1 ROUTE 1 | VFC/POOL INDICATOR | VFC OR POOL NUMBER | FRL |
| RSP 1 ROUTE 2 | VFC/POOL INDICATOR | VFC OR POOL NUMBER | FRL |
| RSP 1 ROUTE 3 | VFC/POOL INDICATOR | VFC OR POOL NUMBER | FRL |
| 604 { RSP 2 ROUTE 1 | VFC/POOL INDICATOR | VFC OR POOL NUMBER | FRL |
| RSP 2 ROUTE 2 | VFC/POOL INDICATOR | VFC OR POOL NUMBER | FRL |
| RSP 2 ROUTE 3 | VFC/POOL INDICATOR | VFC OR POOL NUMBER | FRL |
| 605 — OVERFLOW TO LOCAL CO | | | FRL |

606     607     608

ROUTING PATTERN 1 (610)

|  | 0 | | |
|---|---|---|---|
|  | 0 | | |
| RSP 1, R1 | 0 | 1 | 0 |
| RSP 1, R2 | 0 | 0 | 0 |
| RSP 1, R3 | 0 | 0 | 0 |
| RSP 2, R1 | 0 | 0 | 0 |
| RSP 2, R2 | 0 | 0 | 0 |
| RSP 2, R3 | 0 | 0 | 0 |
| OVERFLOW | 0 | 0 | 0 |

ROUTING PATTERN 2 (620), 621

|  | 0 | | |
|---|---|---|---|
|  | 0 | | |
|  | 1 | 1 | 0 |
|  | 0 | 3 | 1 |
|  | 0 | 9 | 3 |
|  | 0 | 0 | 0 |
|  | 0 | 0 | 0 |
|  | 0 | 0 | 0 |
|  | 0 | 0 | 0 |

. . .

ROUTING PATTERN 8 (680)

|  | 480 | | |
|---|---|---|---|
|  | 1020 | | |
|  | 1 | 1 | 0 |
|  | 0 | 3 | 1 |
|  | 0 | 0 | 0 |
|  | 0 | 0 | 0 |
|  | 1 | 2 | 0 |
|  | 0 | 9 | 3 |
|  | 0 | 0 | 1 |

FIG. 11

| ORIGINATION REGISTER TABLE (ORT) | |
|---|---|
| DIGIT COLLECTION STATE | |
| TOLL CLASS OF SERVICE | FACILITY RESTRICTION LEVEL — 1101 |
| DIGITS RECEIVED | |
| DIGITS EXPECTED | |

FIG. 7

SMDR REPORT

| CALLING PARTY (701) | FACILITY (702) | CALLED PARTY (703) |
|---|---|---|
| 123 | VF1 | 1-415-212-7890 |
| 123 | 104 | 1-415-212-7890 |

FIG. 8

REPERTORY DIAL BUTTON TABLE 800

| BUTTON 1 | VF11 |
|---|---|
| ⋮ | ⋮ |
| BUTTON N | VFM |

FIG. 9

SPEED DIALING TABLE 900

| #100 | XXXXX |
|---|---|
| ⋮ | ⋮ |
| #189 | XXXXX |
| #190 | VF1 |
| ⋮ | ⋮ |
| #199 | VF10 |

FIG. 10

VIRTUAL FACILITY TABLE 1000

| VF CODE (1001) | VF NUMBER (1002) |
|---|---|
| VF1 (1005) | 100 987 4321　　*4567 *9 #5 |
| ⋮ | ⋮　(1003)(1004)　　(1007) |
| VF10 | 101 987 4322　　*4567 *9 #5 |
| VF11 | 102 987 4323 #3 *4567 *9 #5 |
|  | ⋮ (1008) |
| ⋮ | ⋮ |
| VFM (1006) | 100 987 4323 #5 *4567 *9 |

FIG. 12

METHOD AND APPARATUS FOR PROVIDING VIRTUAL FACILITY COMMUNICATION SERVICE

TECHNICAL FIELD

This invention relates to communication systems and more particularly to a method and apparatus for providing a virtual facility connection capability to a communication system.

BACKGROUND OF THE INVENTION

The communication needs (voice and data) of large companies often require interconnecting private branch exchanges (PBX) and/or key telephone systems (KTS) at multiple locations. Where the communication traffic between locations is substantial, a private tie line connection is usually the most cost-efficient way to interconnect these locations. Often, however, the communication traffic between a large system location (e.g., PBX) and a small system location (e.g., KTS) is not substantial enough to make the private tie line interconnecton an economical solution. In such a situation, public facilities may be utilized for communications between these systems. While the use of public facilities for intersystem communications may be cost-efficient, it often results in a sacrifice in feature implementation and dialing uniformity. What is desired is to provide uniform dialing and features for the users of a multi-location system which is interconnected using a public or a private switched network.

SUMMARY OF THE INVENTION

In accordance with the present invention, the public or private switched facilities which provide inter-location system communication connections are made to operate like a virtual private line facility connection. According to the invention, a user wishing to establish a call to a party at another system location first either speed dials or presses a repertory dial button to establish a virtual facility connection between system locations and thereafter dials the called party number to complete the connection to the called party. The speed or repertory dialing sequence is used to access a separate virtual facility to obtain an intersystem dialing signal necessary to set-up the public trunks or facilities required to establish a virtual facility connection between locations. This virtual facility table is made directly accessible by system features (e.g., speed dialing or repertory dialing) and adjunct features (e.g., station message detail reports (SMDR) and automatic route selection (ARS)).

BRIEF DESCRIPTION OF THE DRAWING

The characteristics, features and operation of the present invention will be more apparent from the following detailed description taken in conjunction with the drawing in which.

GENERAL DESCRIPTION

In the following description, each element of each figure has a reference designation associated therewith, the first number of which refers to the figure in which the element is located (e.g., 110 is located in FIG. 1).

Figure 1:
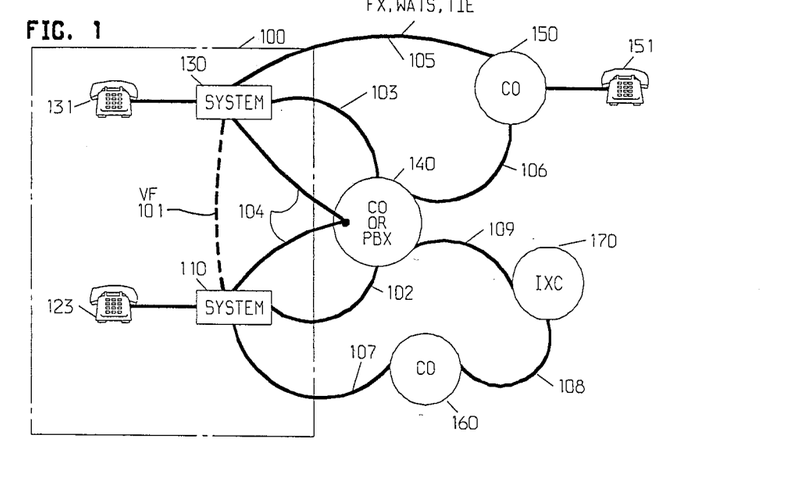
FIG. 1 is a block diagram of a communication network useful for describing the present invention.

Shown in FIG. 1 is a communication system 110 (e.g., a private branch exchange, PBX) which may incorporate the present invention. The present invention may be utilized to establish communication connections between systems 110 and 130 over a public switched network, such as central office (CO) 140 and trunks 102 and 103. Such an application may exist, for example, in a company communication network (100) where system 110 may be located at a company branch location while system 130 may be located at the company headquarters. In such an arrangement, system 110 and system 130 may have one or more private trunks or tie lines 104 interconnecting them. Depending on the cost of these dedicated private tie lines, the size system 110, and the information (voice and data) traffic therebetween, the user may decide to exclusively use either tie lines 104 or public switched network (trunk 102, CO 140, and trunk 103) or to share therebetween the inter-location traffic. As shown, switching office 140 may also be a PBX location and may operate in the same manner as the CO office described above.

Many company or private communication networks may additionally require special trunk groups (105) such as foreign exchange (FX), wide area telephone service (WATS), and private lines (TIE). While the cost of these special trunk groups may prevent a company from providing a direct connection to these trunk groups (105) at all locations (e.g., 110), it nevertheless is desirable to provide these services over the company network (i.e., tie lines 104) to all locations. However, providing these additional special services at system 110 location using tie lines 104 has further added to the communication traffic over tie lines 104.

Thus, for example, if a user at station set 123 on system 110 desires to call station set 151, such a connection may be established using the company's private network, i.e., system 110, tie lines 104, system 130 together with the leased trunks 105 and the public switched network, i.e, in this example, CO 150. Thus, the user dials the tie line number to establish a connection between system 110 and system 130 and thereafter would dial the called party number. If tie lines 104 are busy, then the public switched network (e.g., trunk 102, CO 140, and trunk 103) can be used to make the connection between system 110 and system 130. With joint reference to FIGS. 1 and 3, this requires that the user dial the digit sequence 310 to first establish a connection between system 110 and system 130 over the public switched network prior to dialing the called party's number 320. One aspect of the present invention establishes a virtual facility (VF) connection between system 110 and system 130. This VF connection 101 is accessed or enabled by the operation of a repertory dial button or speed dialing 330 (i.e., a predetermined signal) which in accordance with the present invention is used to access a table to obtain the digits 340 (i.e., intersystem dialing signal) required to establish the connection between system 110 and system 130. Speed dialing or repertory dialing uses the same dialing sequence that is needed to access the private tie lines 104. Note, a repertory dialing button may be a user or a system administrative button which may contain the number needed to establish a virtual facility connection. Obviously, a predetermined called party number can be added to the repertory dialing button.

Figure 3:
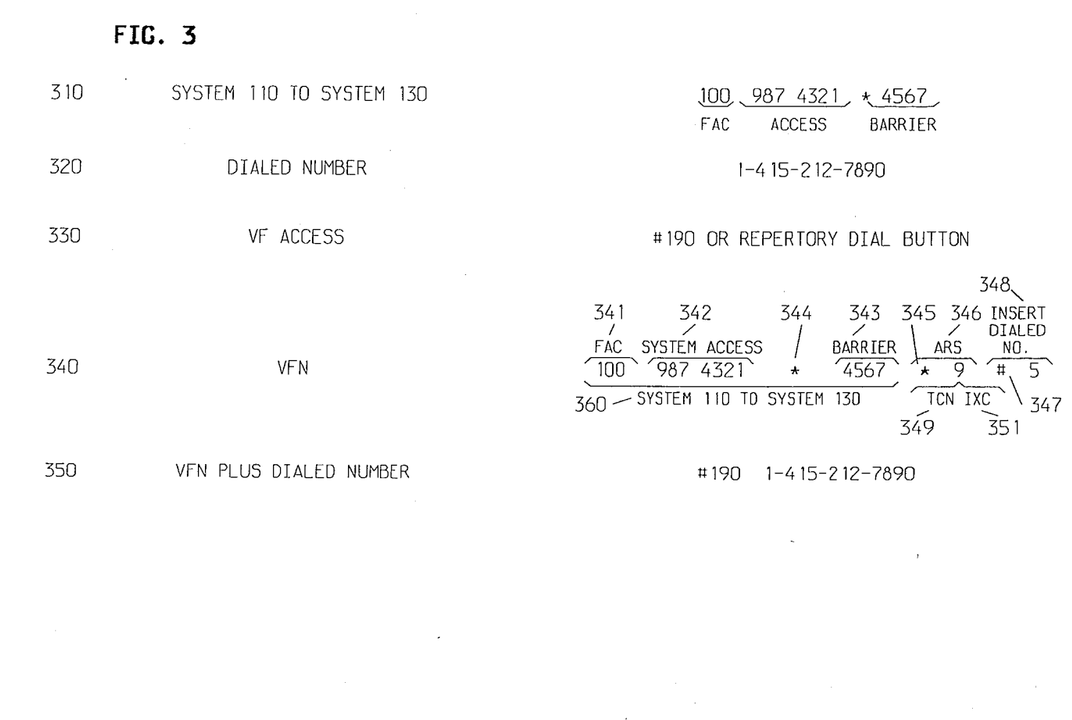
FIG. 3 shows dialing sequences utilized in the operation of the present invention.

Thereafter, the user dials the called party number 320 to complete the connection from system 130 to the called party station set 151 at CO 150.

Thus, a user of system 110 need only know how to operate the VF repertory button or how to speed dial a VF number followed by the called party number (35) rather than know the intricate dialing procedure required to establish the public switched network connection between system 110 and system 130. The result is that the user at station set 123 has completed a call to a station set 151 via system 110, trunk 102, CO 140, trunk 103, system 130, trunk 105 and CO 150. Because such a call uses the leased trunk group 105, it probably is cheaper to make than a call using only the public switched network, i.e., trunk 102, CO 140, trunk 106 and CO 150 to establish the connection between station sets 123 and 151.

It should be noted that the public network needed to interconnect system 110 to system 130 may involve one or more COs and may include a heirarchy of multiple toll offices. Moreover, the toll offices may be part of any one of the long distance Inter Exchange carrier (IXC) networks and may require special dialing sequences. Thus, for example, one typical connection between system 110 and system 130 may utilize trunk 107, CO 160, trunk 108, IXC network 170, trunk 109, CO 140, and trunk 103. In accordance with the present invention, the dialing sequence required for such a connection would automatically be dialed by the system when the VF speed dialing or repertory button is activated.

Figure 2:
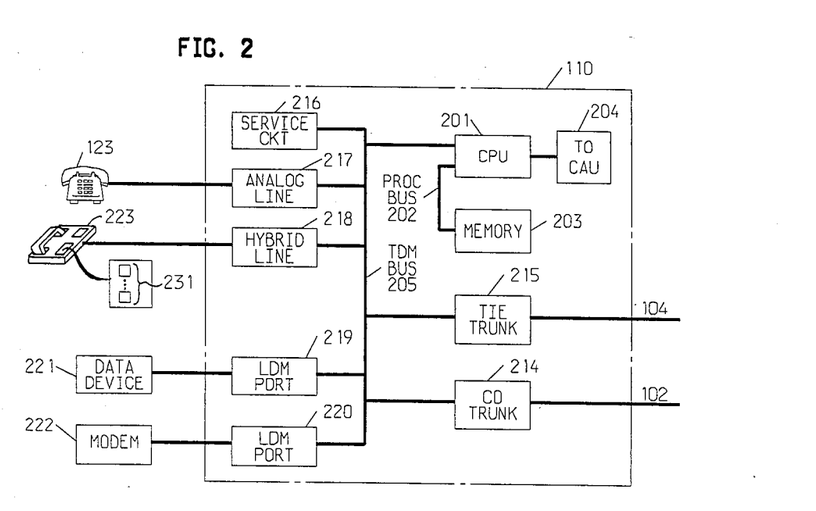
FIG. 2 is a block diagram of an illustrative communication system which may incorporate the present invention.

Before discussing the detailed operation of the present invention, we will discuss an illustrative block diagram, shown in FIG. 2, of a communication system 110 in which the present invention may be embodied. The system 110 controls in a well-known manner call processing between any of the trunks (e.g., 102), station sets (e.g., 123), or devices (e.g., 221) connected to the system ports (214–220). The system controller includes a central call processor unit (CPU) 201, which connects over a processor bus 202 to memory 203. Memory 203 includes read-only memory which stores the system call processing programs, including the programs enables a customer to administer CPU 201 and system 110. The CAU 204 utilized by the present invention. A customer access unit (CAU) 204 also enables a user to manually input or change the operating parameters of the various tables (of FIG. 6) utilized by the present invention. Additionally, CAU 204 may be used to program the speed dialing sequences and repertory buttons 231 at the system station set 223 to implement the virtual facility capability.

The CPU 201 communicates over a time division multiplexer (TDM) bus 205 to a plurality of intelligent port circuits (214–220). System 110 has a distributed switching network architecture whereby some of the common circuitry is incorporated into the microprocessor controlled port circuits. The port circuits may include a variety of line circuits, for example, analog line circuit 217 for interfacing analog telephone 123, hybrid line circuit 218 for interfacing hybrid telephone 223, and digital line circuits 219, 220 for interfacing to a data device 221 or a modem 222. The port circuits may also include a variety of trunk circuits, such as 214, for interfacing to central office (CO) line 102 or tie line circuit 215 for interfacing to tie line 104. Additionally, system 110 may include a variety of service circuits, such as 216, which provide tone/clock generation, tone detection, speech synthesis, etc., for the system.

OVERVIEW OF VIRTUAL FACILITIES

Virtual Facility (VF) in accordance with the present invention defines a hypothetical facility (trunk) which is not defined by the actual physical facility over which the call is made. While the VF appears as a private line connection to the user, it actually defines a route which passes through an interim switch to a network or apparatus which is to receive the dialed digits. With reference to FIG. 1 again, a VF may exist between system 110 and system 130 (similar to private line 104) which enables a system 110 user dialed access through system 130 to reach a WATS trunk. Another VF example may be a dialed access through CO 160 to IXC 170.

Figure 6:
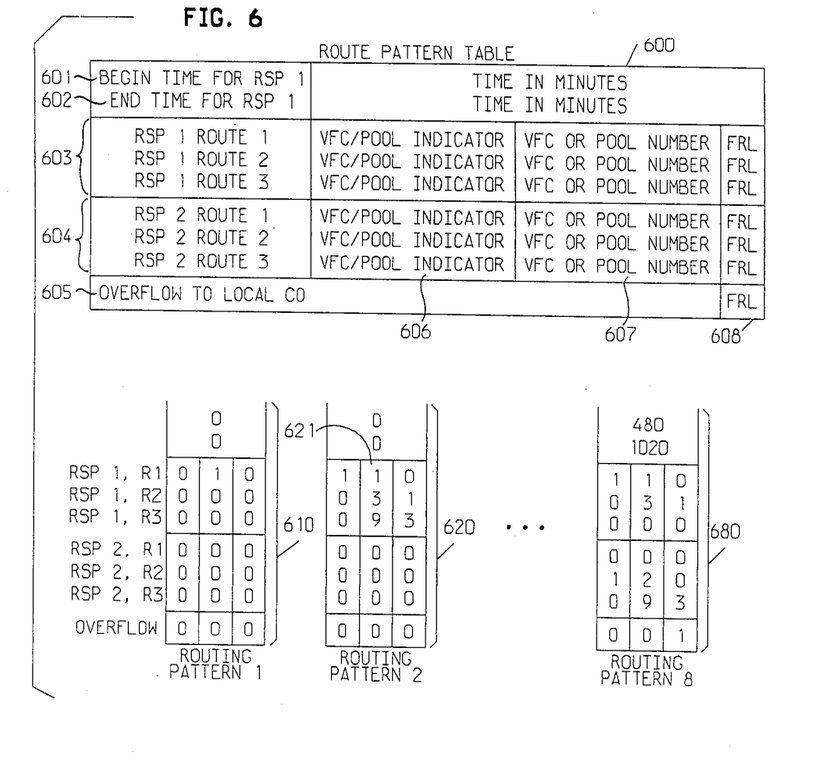
FIGS. 6–11 show the various tables utilized by the present invention.

The VFs are treated by system 110 as if they were a physical trunk group, with a few exceptions. The VFs may be defined along with other speed dialing numbers in the Speed Dialing (Speed Calling) List (701 of FIG. 7) as the last ten entries--Numbers #190 through #199. They are specifically used to define route to other inter exchange carrier networks which may require dial access, access codes, or authorization codes. The VF number may be used exactly as a number of an IXC for instance, or it may be used in alternate route selection (ARS) as one of the routes in the Alternate Routing Patterns table (600).

Figure 7:
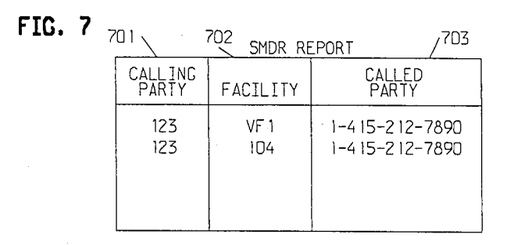

The advantages of using the VF to access another system, carrier, or network go beyond the "convenience" of lessening the number of digits which must be dialed. When a VF number (VFN) is accessed, system 110 call procesor treats this number as a facility for station message detailed reporting (SMDR) purposes. With reference to FIG. 7, this VF number is stored in the "facility" column (702) of the SMDR report and the system continues to collect digits which it attributes to the "called party". This enables the SMDR report to identify calls made over special trunks or carriers in addition to the number which was dialed by the user. Thus, in our example, it would identify a call made from calling station 123 of system 110 via VF #190 (trunk 102, CO 140 and trunk 103, system 130 and WATS line 105) to called station 151 at CO 150. The SMDR table, FIG. 7, records the calling party number 701, the facility used 702, the called party number 703. Thus, SMDR treats calls made over a VF in the same manner as it does calls placed over ties lines through other PBX's, calls placed through a centrex system, an FX, or any other scheme where the call must be routed over intermediate offices where one or more additional dial tones will be encountered. With reference to FIGS. 3 and 7, it should be noted that if a user had manually (i.e., without using a VF number) accessed a facility trunk 341 and dialed the system access number 342 and barrier code 343 and then dialed the called party number 348, the system SMDR program, which generates the SMDR report, would enter the system access number 342 in the called party column 703 of FIG. 7.

Obviously, specifying the system access number as the facility 702 results in inaccurate cost accounting for such calls. The present invention eliminates such a situation by specifying the VF used to make the call, thereby enabling the system to accurately price the call.

When used in conjunction with automatic route selection (ARS), VF allows a variety of special routes to be defined. An example is the call from station 123 to station 151 which may go over a tie line 104 through a remote PBX system 130 to a WATS group (105) of that PBX.

The VF number is as flexible as a speed calling number. With reference to FIG. 3, a VF number, 340, starts with a facility access code (FAC) 341 of the physical facility over which the call is to be placed. The FAC represents the trunk group over which the call is to be placed. Subsequent digits of the VF number allow any combination of dialed digits and pauses up to a predetermined number (e.g., 28) digits. These digits may contain a system access number 342, an authorization or barrier code 343, or any other added digits which the far end switch (or switches) might require.

A direct entry of a "*" indicates a pause in the dialing. Thus, for example, there is a pause 344 between access code 342 and barrier code 343. The barrier code 343 is sometimes referred to as an authorization or security code. There is also a pause 345 between barrier code 343 and the digits 346 representing the trunk group or ARS code. The number 9 indicates that an ARS algorithm selects the trunk route out of system 140. Alternatively, at trunk group number (TGN) 349 and inter exchange carrier (IXC) code 351 could have been predefined.

If a "*" sign is needed to be sent to another switch, the dial code #* will be defined in the VF.

Figure 10:
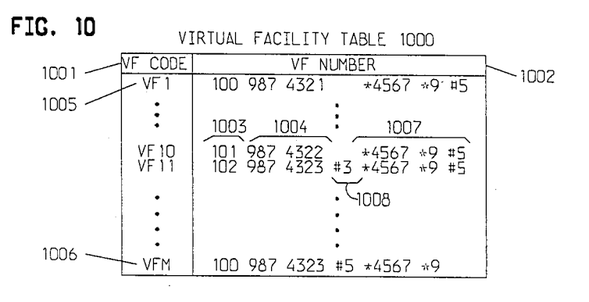

A pound sign three (#3) is used to indicate the end of dialing to the first office (see 1008 of FIG. 10). This causes the system to change from dial-pulse signaling (on DP trunks) to touch-tone (TT) signaling to signal the far end switch.

The code ##is used to indicate to the system that it should transmit a #sign to the interim switch.

The code #5,348, indicates to the system that it should insert the digits dialed by the user in code #5's location. With reference to FIG. 10, the #5 may be inserted at the end of the VF number 1005 or inserted anywhere within the VF number 1006. According to another aspect of the present invention, additional system-provided digits may be appended after the user dialed number (which is inserted in place of #5).

VF Use In Automatic Route Selection (ARS)

In one application VF may be inserted into the ARS Routing Pattern table (e.g., 600 of FIG. 6) as if it were a true physical facility. It therefore allows a single trunk group to be redefined in multiple ways to be used in many different places in the routing pattern table. For VF to operate correctly in this role, it must be given some of the specific atrributes of trunks.

Thus, VF has its own digit insertion and deletion scheme associated with it. This means that a facility such as a tie line which might have a particular digit conversion scheme assigned could be reused in a VF with another scheme associated with it. The digit insertion and deletion takes place on the number which is dialed by the user. The VF is given the Facility Restriction Level (FRL) of the route in which it is inserted. This may or may not correspond to the restriction level of the trunk group they use.

When a VF is defined using a particular trunk group, it has full access to all the trunks in that group. It is considered busy only when the physical trunk group is busy. When placed in a routing pattern in ARS, advancement to another route takes place only if all physical facilities associated with the trunk group assigned to the virtual facility are busy. If the virtual facility is used in the first position of a routing pattern, calls may queue on the embedded trunk pool if all the facilities associated with the other routes of the pattern are busy.

Figure 9:
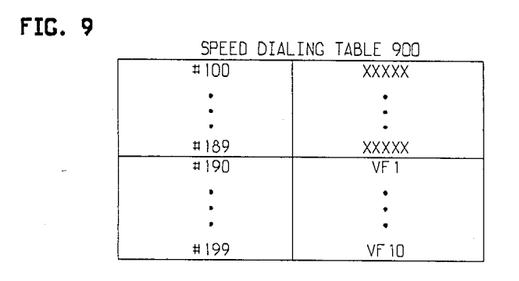

In an alternative embodiment, speed dialing table 900 may contain all the digits 1003, 1004 and 1007 in place of the entry VF1-VF10. The VF table may then contain an internal trunk pool index associated with facility trunk number (1003). These indices represent the actual physical trunk facility used by the system. The VF table may also include an entry associated with each VF code indicating whether the VF number can be directly user dialed from a station set without accessing ARS.

According to another aspect of the invention, changing the content of a virtual facility number (e.g., VF10 in table 1000 of FIG. 10) will automatically update the routing information in all ARS routes associated with this virtual facility (e.g, table 600 of FIG. 6). There is no need to modify the individual routes.

SYSTEM INTERACTIONS

A VF is facility-restricted in accordance with the physical facility it uses. When used with direct access, restriction is based on the station's facility permission.

Button access for VF is provided by programming Repertory Dial Buttons (e.g, 231 of FIG. 2). These are specified in a button table (e.g., a Repertory Dial Button of FIG. 8) as B1-BN. The associated repertory dial numbers VF11-VFM may contain VF as all or part of the number if the VF number are the first digits entered.

With reference to FIG. 9, a speed dial access is provided by dialing a # and then the virtual facility number as defined by #190-#199. A VF number may be included as part of a system or station speed calling or repertory dial numbers if the VF number are the first digits entered. The system speed calling and repertory dialing VF numbers are entered by the system administrator using CAU (204 of FIG. 2).

With reference to FIGS. 6, 7, 8, 9 and 10, it should be noted that a VF code (i.e., VF1, VF10, etc.) is entered in the Route Pattern table 600, Repertory Dial Button table 800, Speed Dialing table 900 or SMDR Report 700 rather than the actual VF number (e.g., 340 of FIG. 3). In accordance with the present invention, a VF table 1000 of FIG. 10 provides the VF code 1001 to VF number conversion 1002. Each of the VF codes may utilize different facility trunks (1003) and system access numbers (1004).

Thus, the VF table (FIG. 10) provides at one central location dialing information changeable only by the system administrator using CAU (204 of FIG. 2). This dialing information is made accessible to the standard feature programs which control ARS (via the table of FIG. 10), SMDR (via the table of FIG. 7), Repertory Dialing (via the table of FIG. 8) and Speed Dialing (via the table of FIG. 9). Besides providing one centralized location for ease of administration, the use of a VF table (FIG. 10) prevents wide publication of the barrier code (343 of FIG. 3) which prevents user abuse of calling privileges. Moreover, the use of VF codes in Repertory Dial Button table (FIG. 8) and Speed Dialing table (FIG. 9) enables individual system users to be able to program their own telephone without the need to know the content of VF numbers (which include the barrier code). Thus, a system station set user does not have to know too many details about the operation of the VF feature to program his station set buttons and to use the feature.

DETAILED DESCRIPTION

Before proceeding with the operating description of the present invention, it should be recognized that the present invention may also be utilized in other telephone communication systems. Since such systems utilize a variety of hardware and programming techniques, no attempt is made to describe the program used to control the communication system. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the flow charts of FIGS. 4–5 and the tables of FIGS. 6–11 to describe the logical steps and various parameters required to implement the present invention.

With reference to FIGS. 1 and 3, the operation of the present invention is described. Assume a user at system 110 wants to establish a connection to a called party having the number shown in 320. If the user has direct access to an outside line, he would dial the number shown in 320. More likely, however, the user has to dial 9 to gain access to an outside line of system 110. In many systems, illustratively system 110, the 9 may activate an automatic route selection (ARS) feature which enables the system to select the cheapest route available for the call rather than using the direct distance dialing (DDD) network. The ARS feature may also automatically select an inter exhange carrier (IXC) for the call and provide the necessary digits to access that inter exchange carrier. This relieves the user of having to know which IXC is cheapest for a particular call and what that IXC's access number is.

Since in the illustrative embodiment of the present invention, special facilities or trunks are available at system 130 and not at system 110, a connection must be established between system 110 and system 130 to gain access to such special facilities. This connection requires the dialed sequence shown as 310 and includes a facility FAC or CO trunk number (e.g., 100), system 130 access (e.g, 587-4321) and a security or barrier code (e.g., 4567).

Figure 12:
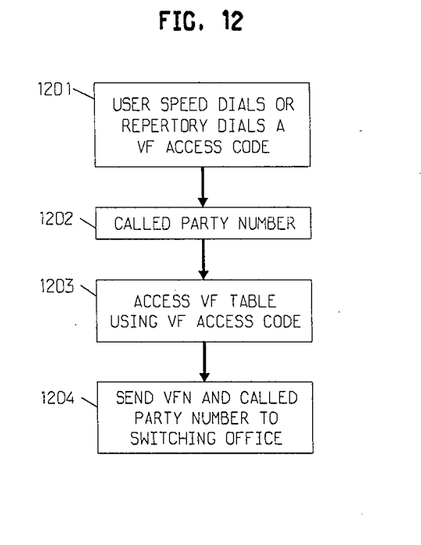
FIG. 12 shows a flow chart describing the operation of the present invention.

The following description makes reference to FIGS. 3, 9 and 12. According to the present invention, a virtual facility number (340) provides the digits required for connection between system 110 and system 130. This VF number in one illustrative embodiment 350 is accessed using a speed dialing button. For example, as shown in the table of FIG. 9, speed dial code number #190 through #199 define ten VF numbers. When the user dials #190 (step 1201) and the called number (step 1202) as shown in 320, system 110 in accordance with the present invention uses the VF access code (901 of table 900) to access VF table 1000 (step 1203) to obtain intersystem dialing signal (i.e., the VFN digits shown in 340). In step 1204, the VFN and called party number are sent to switching office.

Figure 8:
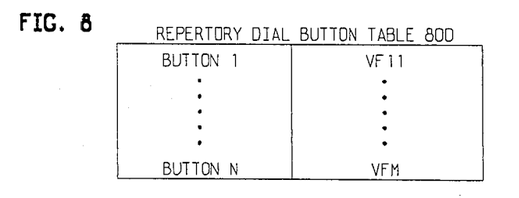

This VF feature saves the user having to remembr the various CO trunk numbers, system 130 access line numbers and security codes. Moreover, for calling cost control purposes, the system administrator of system 110 may not want the security codes 343 widely known to the system users. Hence, with the use of a VF number, the security code need only be known by the system administrator who can change it periodically by changing the associated entries in the VF table of FIG. 10. In an alternative embodiment, a repertory dial button or a direct station select (DSS) button may be used to access the VF number rather than having to speed dial a special VF access number. FIG. 8 shows a table of repertory dial buttons and the VF code associated with each.

When system 110 detects that a VF number has been accessed, using either a repertory button, a DSS button or a speed dial number, it translates that number into the appropriate VF number (340) required to establish a connection to system 130 and then outputs the called number (320) to system 130 which completes the call.

Figure 4:
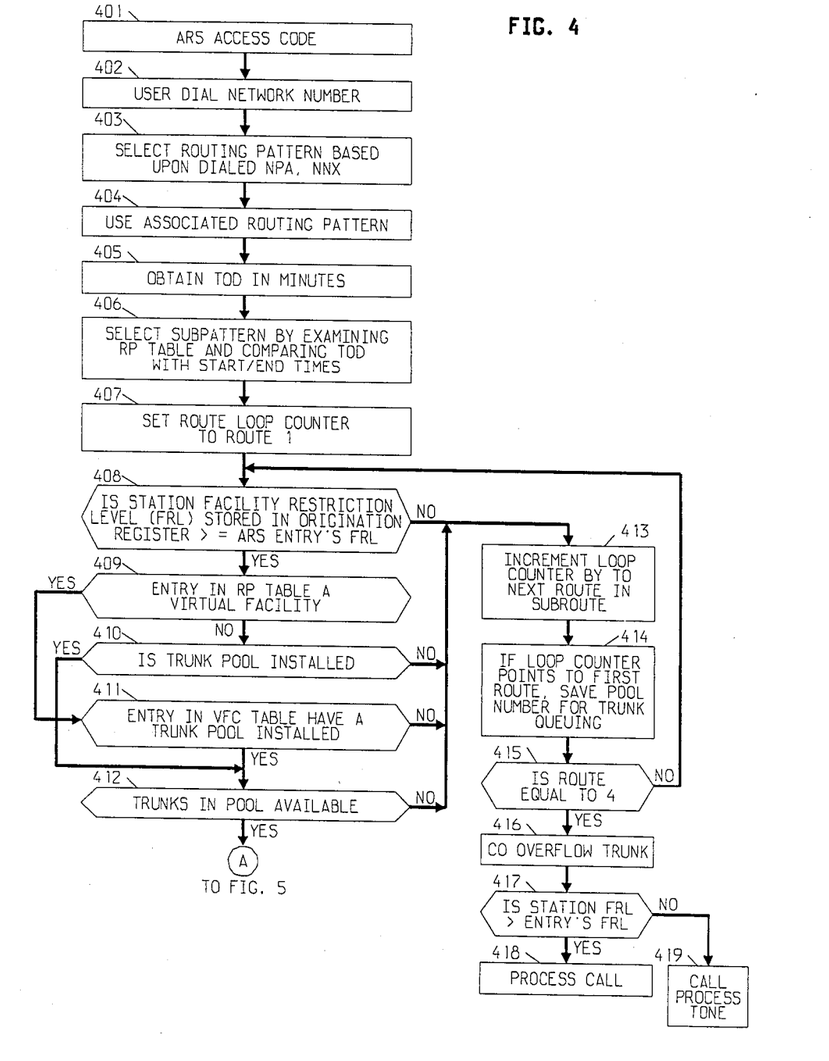
FIGS. 4–5 show flow charts describing the operation of the automatic route selection feature of the present invention.
Figure 5:
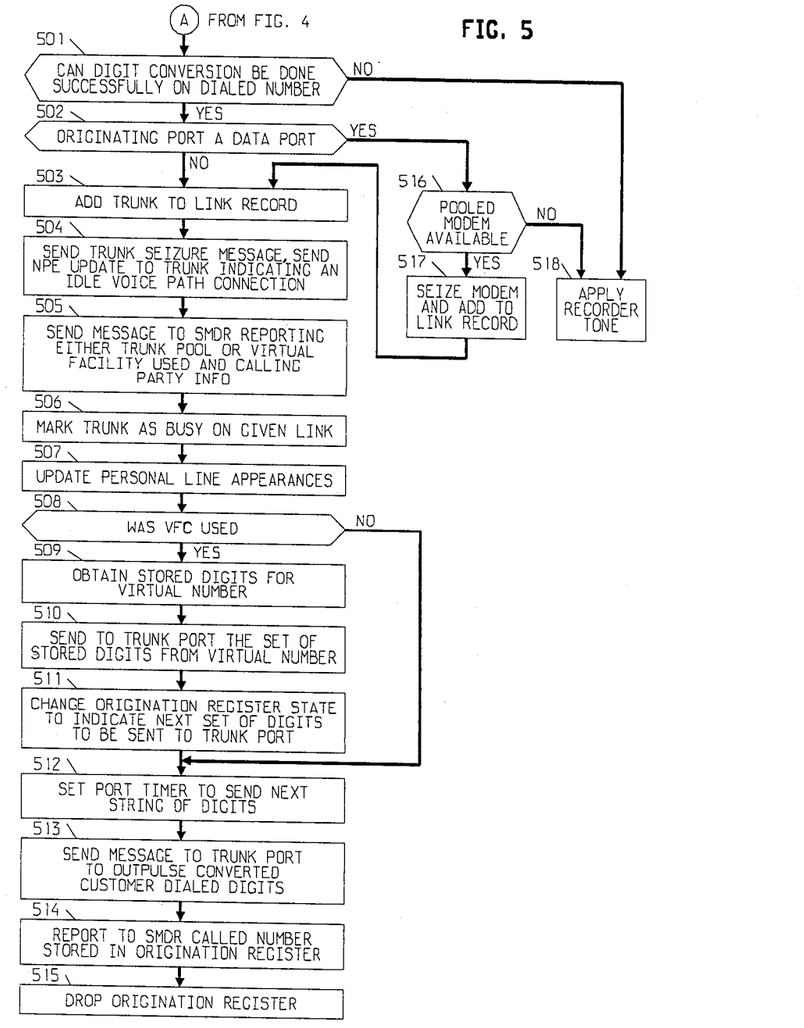

This sequence of events is described more fully with reference to FIGS. 3, 4 and 5. The operaton as described in FIGS. 4 and 5 assumes that not all ARS accessed calls at system 110 use a virtual facility to establish the connection. For example, a local call from system 110 may not require the special facilities of system 130 and hence could be handled by a local ARS feature of system 110.

The operation starts (401) when a user dials directly using an ARS code (e.g., 9) or dials indirectly using a speed dial or a VF number (e.g., #190). Thereafter, in step 402 the user dials the called party network number, i.e., 301. System 110 selects a routing pattern based upon the called party number plan area (NPA), i.e., area code, and the CO exchange code (NNX). This selection, step 403, may involve the standard ARS criteria, such as determining whether the originating station set can make outside calls and any restricton thereon or whether the called number is a local number within NPA; outside of NPA; or a special number list; or an international number; or an operator number. Once the criteria have been determined, the call is routed via a routing pattern a determined in step 404. The particular routing pattern is selected from the routing pattern table.

An illustrative Routing Pattern (RP) table, in accordance with the present invention, is shown by 600 of FIG. 6. The general format for RP table 600 includes the starting time 601 and ending time 602 in minutes which defines the particular time when route subpattern RSP1 can be used. The RP table 600 may include one or more route subpatterns (RSP); illustratively, two route subpatterns are shown, 603 and 604. Each route subpattern RSP1 and RSP2 includes three possible routes. In operation, the system first attemps to complete calls through the first route RSP1,1 and if not possible then through RSP1,2 and finally RSP1,3 before using the CO trunk overflow route. Optionally, an overflow to the local CO office trunk 605 is provided in RP table 600.

Each route may include virtual facility codes (VFC) in column 606, which is "1" when a VFC is present and "0" when a trunk pool is utilized rather than a VFC. In column 607, the VFC or pool number is identified. In column 608, the facility restriction level (FRL) is listed.

Shown in tables 610, 620 and 680 are illustrative values for representative routing patterns. Table 610, routing pattern 1, shows the default translation which provides that during any time of the day, calls will be routed through trunk pool 1 of subpattern 1 (RSP1,1). Note, since the first column entry is zero, the trunk pool 1 is not a VFC but rather is a pool number. Note also, there are no alternative routes in either RSP1 or RSP2 and no overflow to a CO trunk is provided.

Table 620, routing pattern 2, illustrates that the system administrator has defined that subpattern RSP1 is to be used at all times. Since the first column entry is "1", the second column digit identifies a VFC rather than a trunk pool. The digit in the second column indicates the last digit of the VFC, hence the digit 1 means VF1 or VF #191 to the user. Thus, VF1 is the first route of subpattern RSP1 and it has a FRL of 0. Trunk pool 3 is the second route of subpattern RSP1 and it has a FRL of 1. Trunk pool 9 is the third route of subpattern RSP1 with FRL of 3. Thus, a call completion is attempted over VF1 and then trunk pool 3 and finally trunk pool 9. In this particular example, there is no overflow to a CO trunk if all three routes in subpattern RSP1 are busy.

Table 680 illustrates another routing pattern 8. Subpattern RSP1 is to be used from 8:00 AM (480 minutes=8:00 AM) until 5:00 PM (1020 minutes=5:00 PM). The first route is VF 1 with FRL=0. Trunk pool 3 is the second route with FRL=1. The third route is not installed. At times other than between 8:00 AM and 5:00 PM, subpattern RSP2 is used. Subpattern RSP2 has a first route which is not installed so that the standard off-hook queuing does not occur. The second route is VF2 with FRL=0. Trunk pool 9 is the third route with FRL=3. There is overflow to the CO with FRL=1.

The following steps outline how the system in FIGS. 4 and 5 uses Routing Pattern table 600 to complete a call.

In step 405, the time of day TOD is obtained in minutes. In step 406, the TOD is compared against the begin and end times 601 and 602 of table 600. If the TOD is between the begin and end times, then subpattern RSP1 is selected; otherwise, subpattern RSP2 is selected. Once then subpattern is selected, the route loop counter is set to route 1 in step 407.

Figure 11:
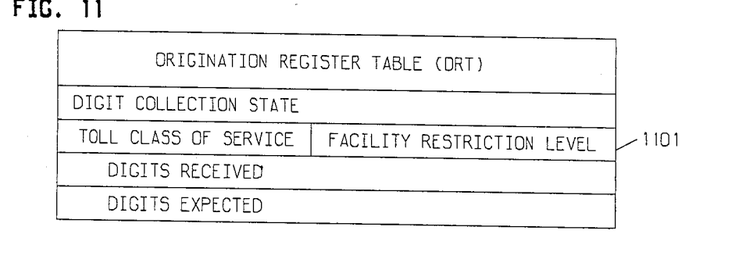

In step 408, the FRL stored in the Origination Register table, step 1101 of FIG. 11, is compared against the FRL for route 1. That is, it determines whether the calling station is permitted to use this type of route to complete a call. If not, then in step 413, the route loop counter is incremented to the next route in that subpattern.

If the FRL of the station is greater than or equal to the FRL of the route, then in step 409 the VFC/pool indicator bit is checked. If the route is not a VFC, then it determines if a trunk pool is installed (410). If not, then the route loop counter is incremented in step 413. If so, go to step 412. If the route is a VFC, then in step 411, it is determined whether the entry in VF table 1000 has a trunk pool installed. If not, the route loop counter is incremented in step 413.

If so, then in step 412 the trunk pool is checked for available trunks. If no trunk is available in the trunk pool, the route loop counter is incremented in step 413. If a trunk is available, in step 501 a determination is made whether a digit conversion can be done successfully on the dialed number. If illegal digit converstion is possible, then apply reorder tone to station user step 518.

Digit conversion is administered by the CAU 204 for each trunk pool or VFC administered. This enables the software to delete any or all of the customer dialed digits. In addition to deleting digits, the system may also insert digits before the customer dialed number. One illustration of an illegal digit conversion is to delete more digits than what the customer dialed.

If digit conversion is possible, then in step 502 it is determined if the originating port is a data port. If it is a data port, then in step 516 a check is made to see if a pool modem is available. If none are available, apply reorder tone in step 518. If one is available, add pooled modem to link record in step 517 and proceed to step 503.

If it is not a data port, then in step 503 the available trunk number is added to the link record. In step 504 a trunk seizure message is sent to the trunk port.

Also, in step 504 the system sends a Network Processing Element (NPE) update to the trunk indicating an idle voice path connection. An NPE is located on each port board (i.e., 214–220) of FIG. 2 to indicate the time slot each port on the board can transmit and/or receive on the TDM bus 205.

In step 505, a message is sent to the SMDR reporting the calling party number (see 700 of FIG. 7). Also, the trunk pool or Virtual Facility code used is reported as the facility number. This is shown in FIG. 7, 702.

In step 506 the trunk is marked as busy on the given link. In step 507 personal line appearances are updated. In step 508 it is determined whether a VFC was used. If no VFC was used, then in step 513 a message is sent to trunk port to outpulse converted customer dialed digits. In step 514, a message is sent to SMDR reporting the called party number dialed by the user (see 703 of FIG. 7). In step 515 the origination register is dropped if no VFC was used. Thereafter, the standard well-known call processing steps continue.

If a VFC was used in step 508, then in step 509 the stored digits are obtained from the Virtual Facility table 1000. These are the digits shown as 340 of FIG. 3. In step 510 these VFC digits, less the initial trunk pool access code, are sent to the trunk port. In step 511 the origination register state is changed to indicate the next set of digits to be sent to the trunk port. In step 512 the port timer is set to send the next string of digits. Once it is known that all digits of the VF number have been sent, then the converted user dialed digits are sent to the trunk port in step 513.

Returning to step 409, once the route loop counter is incremented in step 413, it is determined if the route loop counter is at route 1. If at route 1, the pool number is saved for trunk queuing (414). In step 415 the route loop counter is compared to number 4. If less than 4, then step 408 is carried out.

If the counter is equal to 4, indicating that all the routes in the subpattern have been checked, then in step 416 an overflow to the local CO trunks results. In step 417, the station FRL stored in the originating register is checked against the FRL for the CO trunk. If station RFL exceeds the CO trunk FRL, the call is processed in step 418; otherwise, in step 419 the call is either given a disconnect tone if other than the first route or a holding tone if the first route. The holding tone indicates to the user that it is a trunk queue and will be serviced when a trunk becomes available.

What has been described is merely illustrative of an application of the principles of the present invention. Other methods, sequences or circuits can be used to implement the present invention by those skilled in the art without departing from the spirit and scope of the present invention.

What is claimed is:

1. A private communication system including a common controller connected over a communication facility to a switching office and connected over a communication loop to a station set, said common controller comprising
- means for receiving a predetermined signal preceding a called party signal from a user at said station set,
- means for accessing a virtual facility table using said predetermined signal to obtain a virtual facility number to establish a connection between said communication system and a second private communication system via said switching office, said virtual facility number including an intersystem dialing signal and a predefined code identifying the position where said calling party signal should be inserted within said virtual facility number, and
- means for sending to said switching office a composite dialing signal including said intersystem dialing signal and said called party dialing signal wherein said called party dialing signal is positioned in said composite dialing signal in accordance with said position identifying code.

2. The communication system of claim 1 wherein said predetermined signal is a preselected speed dialing signal entered by said user.

3. The communication system of claim 1 wherein said predetermined signal is generated in response to the operation of a repertory button at said station set.

4. The communication system of claim 1 wherein said composite dialing signal includes a phase character.

5. The communication system of claim 1 wherein said intersystem dialing signal includes a change of dialing format character to cause said communication system to change the type of dialing signal following said dialing format character.

6. The communication system of claim 1 wherein said intersystem dialing signal includes a barrier code to access said second system.

7. The communication system of claim 1 wherein said virtual facility table includes a virtual facility code and an entry associated therewith specifying whether said virtual facility code may be directly dialed at said station set.

8. The communication system of claim 1 further including
- means for generating said intersystem dialing code at an access unit and wherein said generating means is not accessible by a user at said station set.

9. The communication system of claim 1 wherein said controller includes
- station message detail reporting (SMDR) table for storing caller party, facility and called party information and
- means responsive to said predetermined signal for storing a virtual facility code associated therewith as facility information in said SMDR table.

10. The communication system of claim 1
- wherein said predetermined dialing signal includes an automatic route selection (ARS) access code and
- wherein said common controller includes
- route pattern table means for listing call routes selectable by said controller for completing a call to said called party,
- means for checking said route pattern table means using said ARS access code to determine if a call route selected by said controller includes a virtual facility code, and
- means for accessing said virtual facility table using said virtual facility code to obtain said intersystem dialing signal.

11. The communication system of claim 10 wherein changing a virtual facility code automatically changes the routing information in all route pattern tables containing said virtual facility code.

12. A method of operating a first private communication system for establishing a public switched network communication connection between said first system and a second private communication system via a switching office, the method comprising the steps of
- receiving a predetermined signal preceding a called party dialing signal from a user at said first system,
- accessing a facility table at said first system using said predetermined signal to obtain a virtual facility number to establish a connection between said first and second systems, said virtual facility number including an intersystem dialing signal and a predefined code identifying the position of said called party dialing signal within said virtual facility number, and
- sending a composite dialing signal to said switching office including said intersystem dialing signal and said called party dialing signal positioned in said composite dialing signal in accordance with said position identifying code.

* * * * *

UNITED STATES PATENT AND TRADEMARK OFFICE
CERTIFICATE OF CORRECTION

PATENT NO. : 4,802,199

DATED : January 31, 1989

INVENTOR(S) : Michael D. Lange, Nicholas K. Smith, Carl Willems

It is certified that error appears in the above-identified patent and that said Letters Patent is hereby corrected as shown below:

Column 1, lines 23-24, "interconncton" should read --interconnection--.

Column 3, lines 49-52, "including the programs enables a customer to administer CPU 201 and System 110. The CAU 204 utilized by the present invention. A customer access unit (CAU) 204 also" should read --including the programs utilized by the present invention. A Customer Access Unit (CAU) 204 enables a customer to administer CPU 201 and system 110. The CAU 204 also--.

Column 8, line 19, "operaton" should read --operation--.

Column 9, line 61, "converstion" should read --conversion--.

Column 12, line 6, "caller" should read --calling--.

Signed and Sealed this

Third Day of October, 1989

Attest:

DONALD J. QUIGG

Attesting Officer

Commissioner of Patents and Trademarks